(No Model.) 6 Sheets—Sheet 1.

F. S. BRADLEY & J. P. LAVIGNE.
STAPLE STITCHING MACHINE.

No. 496,634. Patented May 2, 1893.

(No Model.) 6 Sheets—Sheet 3.

F. S. BRADLEY & J. P. LAVIGNE.
STAPLE STITCHING MACHINE.

No. 496,634. Patented May 2, 1893.

(No Model.) 6 Sheets—Sheet 5.

F. S. BRADLEY & J. P. LAVIGNE.
STAPLE STITCHING MACHINE.

No. 496,634. Patented May 2, 1893.

Witnesses
J. H. Shumway
N. E. Cole.

Frank S. Bradley
and Joseph P. Lavigne.
Inventors
By atty Earle Seymour (No Model.) 6 Sheets—Sheet 6.
F. S. BRADLEY & J. P. LAVIGNE.
STAPLE STITCHING MACHINE.

No. 496,634. Patented May 2, 1893.

UNITED STATES PATENT OFFICE.

FRANK S. BRADLEY AND JOSEPH P. LAVIGNE, OF NEW HAVEN, CONNECTICUT.

STAPLE-STITCHING MACHINE.

SPECIFICATION forming part of Letters Patent No. 496,634, dated May 2, 1893.

Application filed July 25, 1892. Serial No. 441,146. (No model.)

*To all whom it may concern:*

Be it known that we, FRANK S. BRADLEY and JOSEPH P. LAVIGNE, of New Haven, in the county of New Haven and State of Connecticut, have invented a new Improvement in Staple-Stitching Machines; and we do hereby declare the following, when taken in connection with accompanying drawings and the letters of reference marked thereon, to be a full, clear, and exact description of the same, and which said drawings constitute part of this specification, and represent, in—

Our invention relates to an improvement in staple-stitching machines, the object being to produce a compact, durable and effective machine, capable of rapid operation, containing few parts, and adapted to a considerable range of adjustment to suit different kinds of work.

With these ends in view, our invention consists in certain details of construction and combinations of parts as will be hereinafter described and pointed out in the claims.

Figure 1:
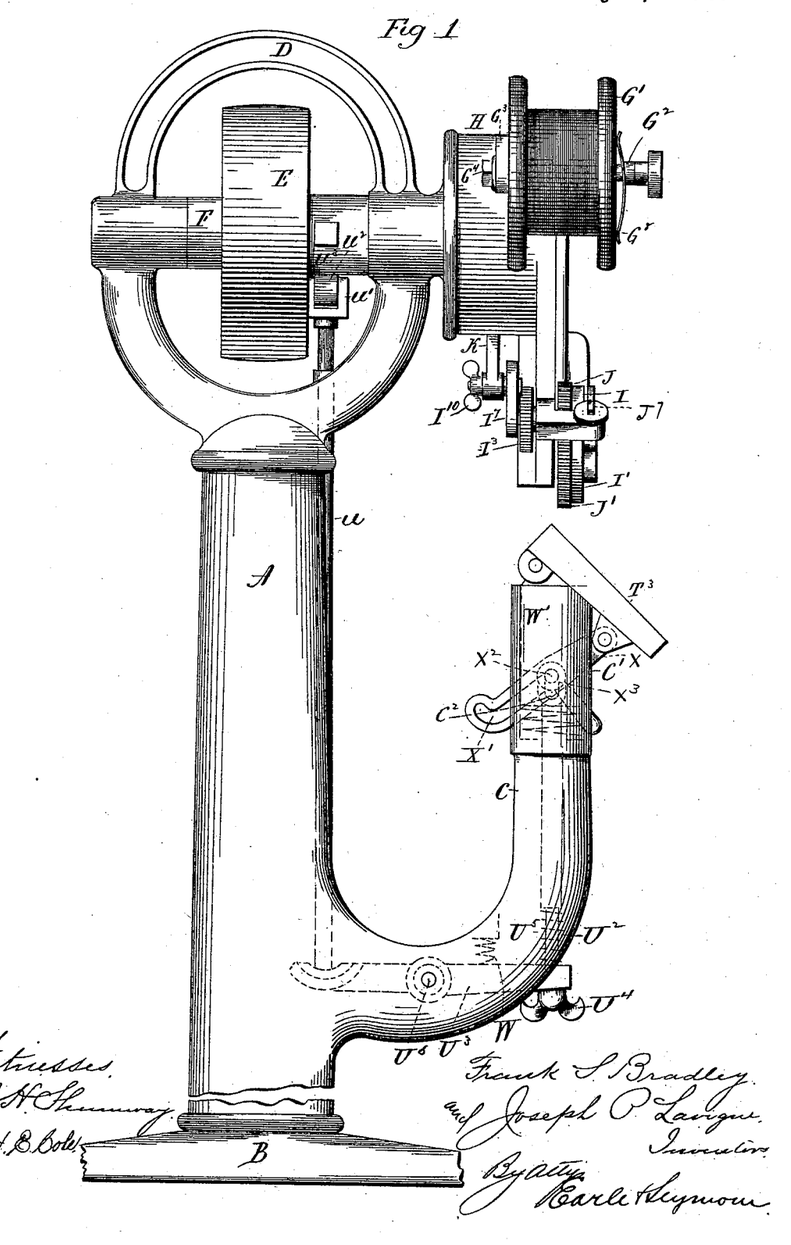
Figure 1, a view in side elevation looking toward the feeding mechanism of a machine constructed in accordance with my invention.
Figure 2:
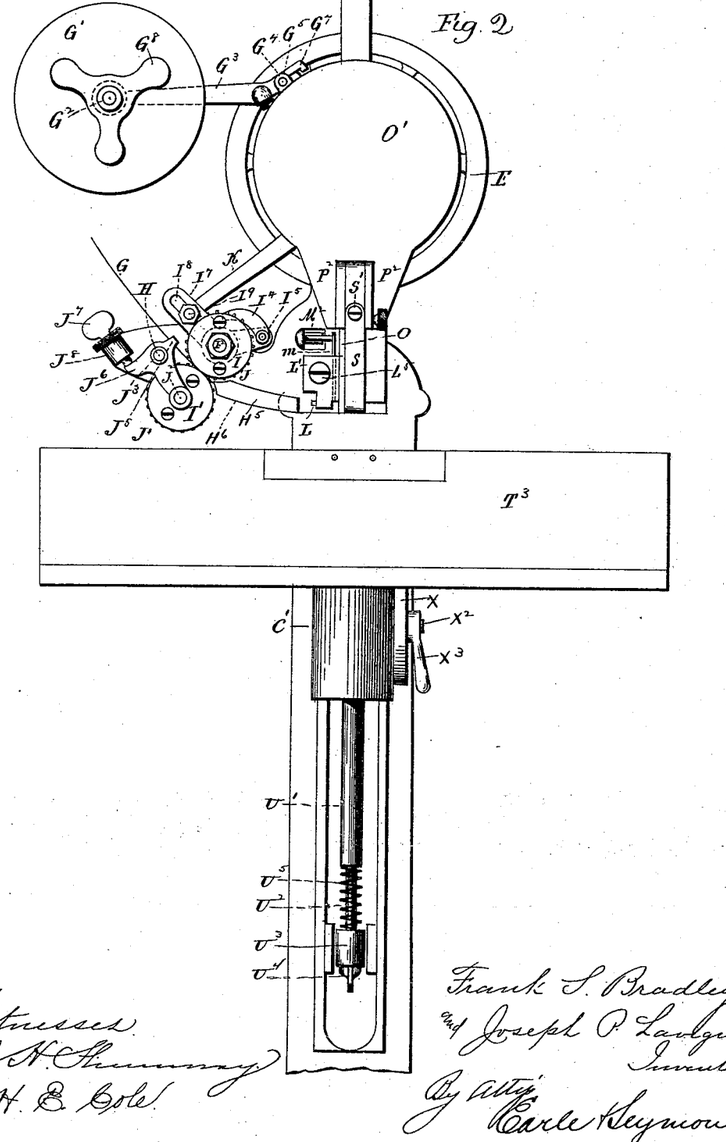
Fig. 2, a broken view of the machine partly in vertical section but chiefly in front elevation.

As herein shown, the mechanisms of our improved machine are mounted in a frame or standard, consisting of a hollow upright post A, constructed at its lower end with a foot B, by means of which it is secured to the floor, with a hollow arm C, curving outward and then directly upward, and with an oval head D, located at its upper end, receiving the driving-pulley E, and the clutch mechanism thereof, and affording bearings for the ends of the driving-shaft F. As shown in Fig. 1 of the drawings the post A, is broken away just below the arm C, which in fact offsets from it about midway of its length.

In describing the different mechanisms of the machine, we will take them up in the order of their succession in its operation, beginning with the mechanism for feeding the wire.

The wire G, is coiled upon a spool G', which is mounted upon a spool-holding spindle $G^2$, secured at its inner end to an arm $G^3$, hung on a pivot $G^4$, mounted in two ears $G^5$, cast integral with the box or case H, and located a little to the right of the top thereof. A spiral spring $G^6$, interposed between the said arm $G^3$, and the exterior surface of the box H, at a point close to the pin $G^4$, and between the same and the spool-holding spindle $G^2$, is provided to permit the said arm and the spool to yield when the wire is being fed. A stop-arm $G^7$, forming a continuation of the arm $G^3$, and located on the opposite side of the pivot $G^4$ from the spring $G^6$, limits the rocking action of the arm $G^3$ under the influence of the spring $G^6$. The rotation of the spool $G^8$ upon the spindle $G^2$, is controlled by tension springs $G^8$ of ordinary construction. From this spool the wire is led downward between the feed-rolls I and I', made of hardened steel, and removably attached respectively to two corresponding intermeshed pinions J and J', by screws $j$ $j$. The object of making the feed-rolls removable from the pinions is to enable the rolls to be readily renewed when they are worn. The upper feed-roll I, together with its pinion J, is mounted on a shaft $I^2$, journaled in an arm H', offsetting to the left from the lower end of the box or case before referred to. The projecting rear or inner end of the shaft $I^2$, is furnished with a ratchet-wheel $I^3$, which is engaged and actuated by a pawl $I^4$, hung on a pin $I^5$, mounted in the extreme inner end of the short arm $I^6$, of a bell-crank lever, swiveled on the said shaft $I^2$, and having its longer arm $I^7$ constructed with an elongated slot $I^8$, which receives a clamping-stud $I^9$, located in the extreme end of the eccentric K, which projects through a clearance slot K' formed for it in the box or case H. A thumb-screw $I^{10}$ applied to the extreme inner end of the clamping-stud $I^9$, is provided for binding the same to the arm $I^7$, at any point within the limits of the slot $I^8$ therein, so as to adjust the throw of the pawl $I^4$, and thereby regulate the feeding of the wire. A manual $I^{11}$ located at the extreme inner end of the shaft $I^2$, enables the same to be freely turned by hand in the direction required for rotating the feed-rolls in feeding the wire. This manual will be found convenient to use in feeding the wire for starting the machine and in testing the grip of the feed-rolls upon the wire. The lower feed-roll I' and its pinion J' are mounted upon a short shaft $J^2$, the opposite ends of which are journaled in a swinging frame $J^3$, hung from the arm H' on a stud $H^4$. This frame is provided with an inwardly projecting ear having a perforation $J^5$, through which the wire passes before it is delivered to the feed-rolls. The upper end of the said frame is also provided with a lug $J^6$, which is engaged by a tension-screw $J^7$, mounted in an ear $J^8$, formed at the extreme outer end of the arm H'. It will be apparent that by turning the screw $J^7$ inward, the swinging frame $J^3$ will be turned on its stud $H^4$, and the feed-rolls brought nearer together. By turning the screw $J^7$ backward, the lower feed-roll will drop away from the upper feed-roll by gravity, and relieve their grip on the wire.

From the feed-rolls just above described, the wire is led through a groove $H^5$, formed in the upper face of a rib $H^6$, extending forward from the lower edge of the arm H', to the cutting-off mechanism. This comprises a horizontal, cylindrical longitudinally slotted die L, mounted in the lower end of a cutter-box L', the lower end of which is longitudinally bored out to receive the said die, and constructed with a horizontal slot $L^2$, leading into the said bore, and receiving a thin finger, extending into the slot of the die to prevent the same from turning in the box, and compelling the wire to run in the bottom of the die-slot, the said finger being formed upon the inner face and at the lower end of a small block secured by a screw $L^5$, to the lower end of the cutter-box L', which is secured in place by a screw $L^6$ passing through a horizontally elongated slot $L^7$, within the limits whereof the said cutter-box is horizontally adjustable. A vertical slot $L^8$ formed in the extreme inner edge of the cutter-box, receives a long narrow shearing cutter M, which co-operates with the inner end of the die before mentioned, the upper end of this cutter being enlarged and slotted for engagement with the adjacent cog-like end of a rocking-arm M', mounted upon a horizontal pin or shaft, and located in an opening $M^2$, formed to receive it in the arm H'. The projecting inner end of this rocking-arm is engaged for rocking the arm and depressing the cutter M, by the curved lower end N, of the eccentric-rod N'. A spring $N^2$, interposed between the upper face of the projecting inner end of the said rocking arm and a lug $N^3$ formed upon the rear face of the arm H', is provided for restoring the said arm to its normal position, in which its outer end is lifted for raising the vertically movable cutter M. This cutting off mechanism is in its main features like the cutting off mechanism described in Patent No. 438,399, granted to us October 14, 1890, for a similar machine.

Figures 5, 6, 7, 8, 9, 10:
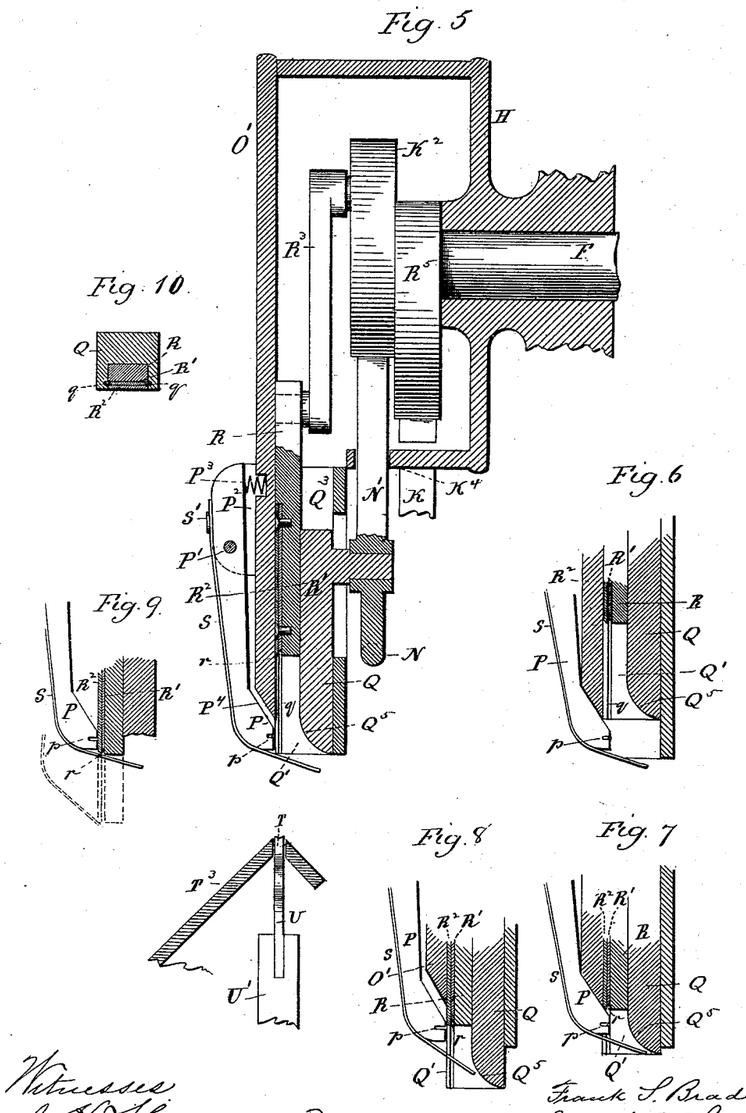
Fig. 5 is a broken rear view of the lower end of the box H and its arm H' and the instrumentalities attached thereto.
Fig. 6 is a view in vertical central section through the head or box of the machine showing the positions of the parts just after the wire has been fed, its ends being at this time on the face of the former.
Fig. 7, is a similar but less comprehensive section showing the elevation and retirement of the former permitting the inward movement of the anvil with its staple-length of wire which is thus brought into position to be acted upon by the former.
Fig. 8, is a similar view showing the driver at the time of its engagement with the anvil for pushing the same out of the way to release the formed staple.
Fig. 9 is a similar view showing the retaining spring about to engage with the crown of the staple to hold the same in place and in shape while it is being driven.
Fig. 10, a detached view in transverse section of the former and driver.
Figure 11:
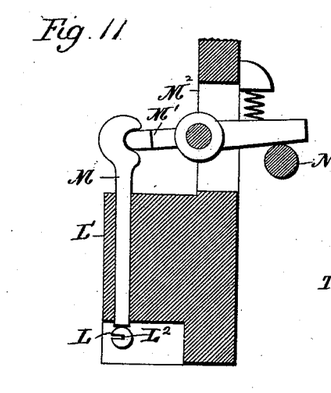
Fig. 11 is a detached view in vertical section through the arm L', showing the cutter M and the operating connections thereof.
Figure 12:
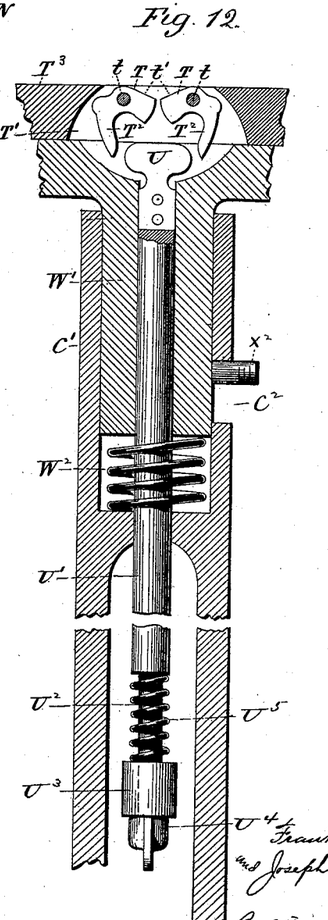
Fig. 12 is a similar view showing the clinching mechanism.

From the cutting-off mechanism just above described, the wire is fed to the staple forming and staple-driving mechanism, which must be described together. From the inner end of the die L, the wire enters into an aligned, conical opening o, formed in a leg-like extension O of the face-plate O', which is secured to the front of the case H. This conical opening guides and centers the wire and effects its right presentation to an open horizontal slot p, formed in the lower end of the anvil P, which is hung on a horizontal pivot P', between two vertical lugs $P^2$ $P^2$, formed integral with and projecting forward from the lower end of the said face-plate O'. A spiral-spring $P^3$, located between the face-plate and the extreme upper end of the anvil, exerts a constant effort to throw the lower end of the anvil inward. The inner face of the said lower end of the anvil is constructed at a point directly above the slot P, with a bevel $P^4$, by means of which the anvil is retired or pushed out of the way, as will be described later on. After the wire has been fed into the anvil and cut off, the anvil is allowed to move inward by the elevation and virtual retirement of the chambered former Q, which is rectangular in general outline, and adapted to play up and down in a slot Q', formed in the lower end of the case or box H, the former being thereto connected by a rearwardly extending stud $Q^2$, with the eccentric-rod N', at a point above the bent lower end N, thereof. The said former is constructed with a deep rectangular chamber $Q^4$ located in the middle of its outer face, extending throughout its length, and receiving the staple-driver which sets into it flush with its outer face, and is composed of a body or bar R, having a hardened driving-plate R', and a similar retaining-plate R², secured to its lower end, which is thereto cut away upon its outer face. The upper end of the said bar is connected by a crank R³, with the outer eccentric R⁴, which is mounted upon the extreme end of the driving-shaft F, the said shaft extending beyond its bearing in the open frame or head D, into the box or case H. The said eccentric R⁴ is encircled by the strap R⁵ of the eccentric-rod N'. By means of these connections, the former and the driver are vertically reciprocated independently of each other from the same eccentric. We may here mention that the eccentric-rod K, through which the feeding mechanism is actuated, is the continuation of an eccentric-strap K², which encircles an eccentric K³, which is mounted on the driving-shaft F', and inclosed within the box H, being located directly back of the eccentric R⁴, before mentioned. As seen in Fig. 5 of the drawings the box is provided with a clearance-opening K⁴, for the eccentric-rod N'. As seen in the same figure of the drawings also, the upper end of the former is slotted as at Q³, to clear the lower end of the crank R³ when the same is depressed for the depression of the driver without a corresponding movement of the former. The opposite walls of the chamber Q, are constructed with vertical grooves q q, located directly opposite each other near the outer face of the former. These grooves are a very little larger in cross section than the cross-section of the wire which they receive for forming the same into staples. These grooves also receive the edges of the driving-plate R', which is just enough wider than the bar R, so that its edges will project from the sides thereof and fill the said grooves. The retaining-plate R² of the driver, however, corresponds in width to the body R, being therefore narrower than the plate R', than which it is a little longer, as shown by Fig. 5 of the drawings, so as to form in the lower end of the driver, and in combination with the body R and the plate R', a little pocket r, to receive the middle portion of each staple length of wire, the said middle portion ultimately becoming the crown of the staple. By constructing the plates R' and R² as described, they may be readily reversed end for end when they become worn, or renewed. The lower end of the chamber in the former is cut away, as at Q⁵, so as not to interfere with the inward movement of the retaining-spring S, which as herein shown, corresponds in width to the width of the anvil to which it is attached by a screw S'. This spring engages with the crowns of the staples and prevents the same from being displaced with reference to the driver, and from being "buckled" while their ends are piercing the papers or books being stitched.

Figure 3:
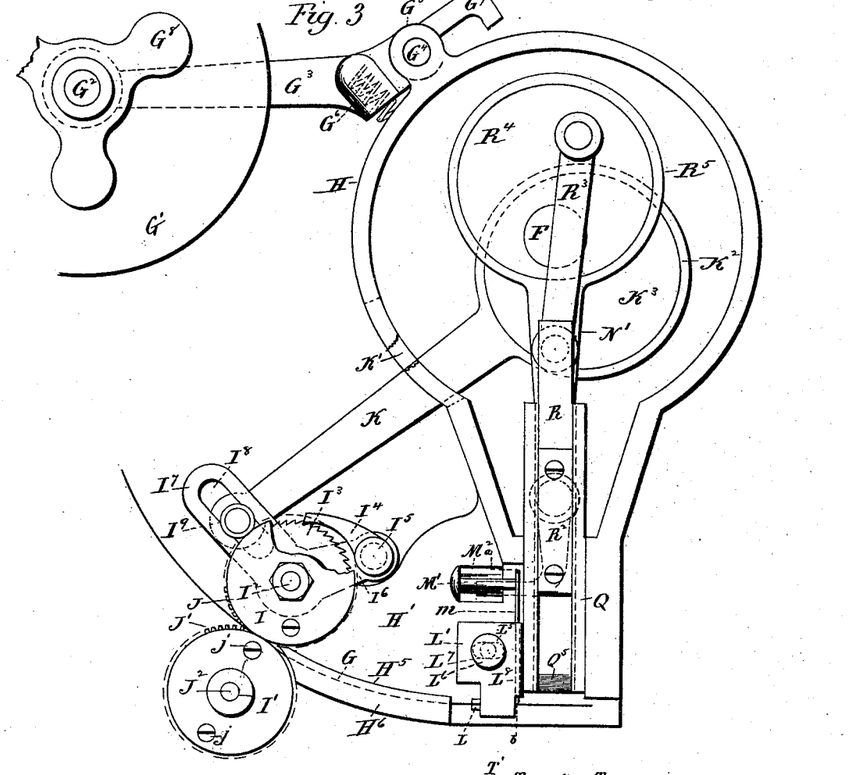
Fig. 3, a broken view in front elevation on a large scale of the feeding, driving and clinching mechanism of the machine, showing them in the positions due to them just after the wire has been fed and before it has been cut off.
Figure 4:
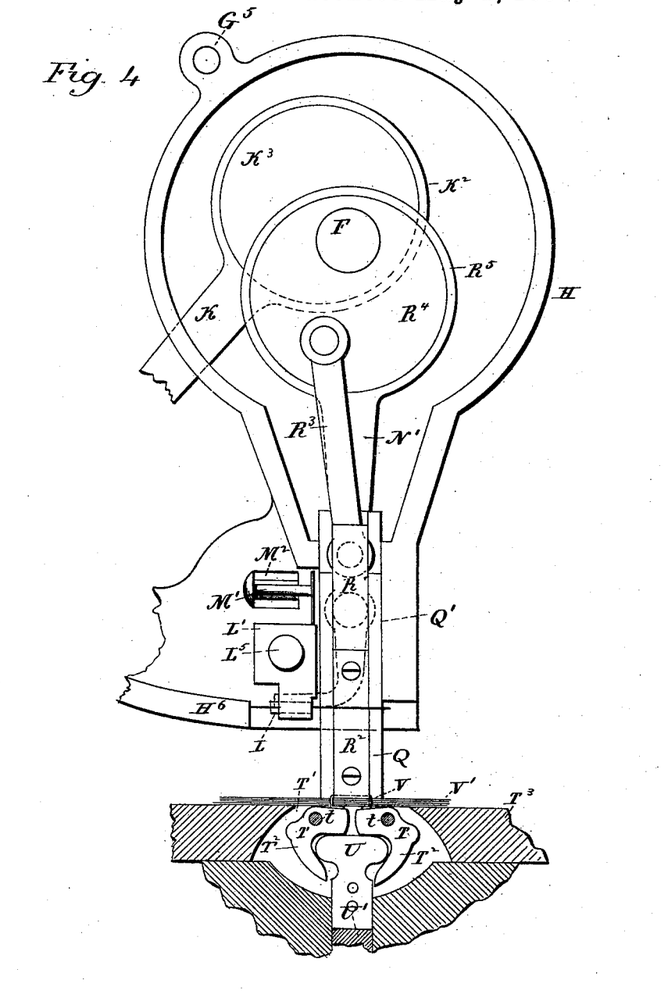
Fig. 4, a similar view omitting the feeding mechanism and showing the forming, driving and clinching mechanism in the positions due to them after the staple has been formed, driven and clinched.

From the staple-forming and driving mechanism the staples are delivered to the clinching mechanism which is located below them. This comprises two pivotal clinchers T, T, hung upon horizontal pins t, t, in an elongated slot T', formed in the edge and midway the length of a V-shaped head T², to which the pivotal stitching-table T³ is attached. Normally the clinching faces t' t', which are slightly grooved longitudinally, are inclined toward each other, as seen in Fig. 3 of the drawings, whereby the ends of the staples are drawn together. The lower end of the clinchers are cut away to receive a horizontally enlarged clinching head U, having a short shank which is inserted into a slot formed in the upper end of a vertically movable clinching-rod U'. Normally the said head is in the position in which it is shown by Fig. 3 of the drawings, being in that position disengaged from the inwardly extending arms T², T², of the clinchers, whereby the said arms are left free to turn by gravity into their normal positions in which their clinching-faces t', t', are inclined toward each other. When, however, the rod U' is raised, the clinching-head U at its upper end strikes the inner ends of the clinchers, and lifts them, as shown by Fig. 4 of the drawings, whereby the ends of the staple are bent into their final positions, as shown in the said figure, which represents a staple V, applied to a book V'. When the inner ends of the clinchers are elevated as described, their lower ends are thrown inward so as to virtually embrace the clinching-head by which they will be separated and restored to their normal positions when the head is depressed into its normal position, as shown by Fig. 3 of the drawings. The clinching-rod U', extends downward through the socket C' formed at the upper end of the arm C, and receives at its lower end a coupling-rod U², the lower end of which passes through the outer end of the operating lever U³, the projecting lower end of the said rod U², being threaded to receive a thumb-nut U⁴. A spiral spring U⁵, encircling the rod U², and interposed between the lower end of the clinching-rod and the upper face of the lever U³, forms a yielding connection between said clinching rod and lever through which latter the rod U² passes. A spring W, interposed between the arm C, and the outer end of the said lever U³, exerts a constant tendency to depress the said end of the arm, and therefore draw the clinching-rod U' down into its normal position. The said lever U³, is hung on a horizontal shaft U⁶, and its inner end which extends into the post A, is adapted to be engaged by the lower end of the upright operating-rod u, the upper end whereof has bearing in the head D, and is provided with a yoke u' carrying an anti-friction roll u², which is engaged by a cam u³, mounted on the driving-shaft F. It will be clear from this description that when the rise of the said cam engages with the said anti-friction roll u², the operating-rod u, will be depressed with the effect of operating the lever in lifting the clinching-rod U' and hence throwing the clinchers T T into their clinching positions.

The V-shaped head $T^2$ before mentioned, is formed at the upper end of a post $W'$, which fits into the socket $C'$, and is vertically movable therein. A spiral spring $W^2$ interposed between the lower end of the said post and the bottom of the socket, is employed in setting the table at the right elevation for the work to be done. The said table which may be used either in a horizontal or an inclined position, has pivoted to its under face, a lever X, constructed with a locking-slot $X'$, which receives the projecting outer end of a stud $X^2$, the said stud being threaded at its extremity to receive a manual $X^3$, which is turned up against the lower end of the lever to clamp the same when adjusted for supporting the table in its horizontal position. The said stud enters the post $W'$ before mentioned, and projects through a vertical, elongated slot $C^2$ formed in the socket $C'$. It is apparent that when the manual is turned up against the lever, that the post will be drawn against the adjacent wall of the socket and bound and fixed in position. When it is desired to set the table at the right elevation for stitching a quantity of books, for instance, the manual is turned so as to relieve the post and permit the table to be lifted into an elevated position in which it will be temporarily supported by the spring $W^2$. One of the books of the lot to be stitched is then placed in the machine which is operated in applying a staple to the book. During this operation the former of the forming and driving mechanism will engage with the book and compress the same, and transmit its downward pressure to the table, which will retire against the action of the spring $W^2$, until the table is exactly accommodated in its vertical position to the thickness of the book to be stitched. When the former has reached the limit of its down throw, the manual or locking-lever is tightened up to bind the post against the adjacent wall of the socket, whereby the table will be sustained in that position until it is necessary to reset it again. In setting the machine the thumb-nut $U^4$ is adjusted until the tension of the spring $U^5$ when compressed is sufficient to lift the vertically movable clinching-rod $U'$, and hence the clinching-head U when the machine is doing its heaviest work. The clinchers T T against which the clinching head works will operate more or less freely according to the heaviness of the work which they are called upon to do. The power actually required therefore to lift the clinching-rod will vary. The clinching-mechanism is however automatically accommodated to this variation through the spiral spring $U^5$, which is compressed more or less according to the power required to lift the rod.

The machine is also provided with a clutch-mechanism which may be of any approved construction, such for instance as the clutch mechanism shown and described in connection with our patent hereinbefore referred to. The cam $u^3$ forms a feature of this mechanism, which is operated by a treadle, which it has not been thought necessary to show or describe herein.

Although the operation of our machine has been largely described in connection with the foregoing description, its successive steps will be briefly set forth again.

Let it be assumed that the wire has been fed into the anvil, at which time its ends will be engaged with the face of the former, as shown by Fig. 5 of the drawings, the driving-bar being at this time in an elevated position. The former will now be lifted above the anvil, which is thus allowed to move inward under the action of its spring $E^3$, and the wire is cut off, and is moved by the anvil under the former, its ends then resting against the face of the box H, as shown by Fig. 6 of the drawings, and being located directly beneath the grooves Q Q in the former which now descends and bends them to form the staple, the middle or crown portion whereof is still held by the anvil. Both the former and the driver now descend, the former engaging with the work and compressing it. When the driver descends the extreme lower end of its retaining-plate engages with the bevel $P^4$ of the anvil, and throws the same out of the way, whereby the crown of the staple is left free to enter the little pocket $r$, formed in the lower end of the driver, which now descends, pushing the staple before it. As the driver and former descend, the retaining-spring S, is allowed to spring under the driver and under the crown of the staple, thus holding the same snugly in its pocket in the driver, and preventing it from "buckling" as its ends are driven through the paper. The spring is finally displaced by the retaining plate of the driver after the staple has been inserted, and just before it is driven home. Then just as the former and driver begin to be elevated, the clinching mechanism operates to clinch the ends of the staple upon the opposite side of the book, and the operation above described is repeated, the wire being fed again during the ascent of the former and driver.

We would have it understood that in carrying out our invention we do not limit ourselves to the exact construction herein shown and described, nor to combining the particular feeding, forming and driving and clinching mechanisms set forth, as it is apparent that they may be used in other combinations; for instance, the forming and driving mechanism would be operative with different feeding and different clinching mechanisms.

We are aware that gripping rolls combined with intermeshing driven pinions, one of which is movable toward and from the other, are not broadly new. We are also aware that it is not broadly new to operate two pivotal clinchers by means of a transversely enlarged operating-head located at the upper end of an operating-rod. We do not therefore claim either of those constructions broadly.

Having fully described our invention, what we claim as new, and desire to secure by Letters Patent, is—

1. In the feeding mechanism of a staple-stitching machine, the combination with two feed-rolls, of two intermeshed pinions to which the said rolls are removably attached respectively, a swinging frame in which one of the said rolls and its pinion are mounted, a tension screw for swinging the said frame to bring the rolls into right relations for gripping the wire, and means for actuating the rolls in rotation, one of the rolls having a manually rotatable shaft whereby the wire may be fed manually in testing and setting the machine, substantially as described.

2. In the feeding mechanism of a staple-stitching machine, the combination with two feed rolls, of two intermeshed pinions to which the said rolls are secured, a swinging frame in which one of the said rolls and its pinion are mounted, a tension screw for swinging the said frame to bring the rolls into right relations for gripping the wire, a ratchet-wheel mounted on the shaft of the other roll and pinion, a bell-crank-lever, a pawl carried thereby and engaging with the said wheel, an eccentric-rod adjustably connected with the said lever for actuating it and the pawl, and an eccentric for actuating the said rod, substantially as described.

3. In a staple-stitching machine, the combination with a staple former having a deep longitudinal groove, of a driver located in the said groove, means for reciprocating the former and driver independently of each other, a pivotal anvil having a horizontal groove to receive the wire, and a retaining-spring to engage with and follow the lower face of the crown of the formed staple, substantially as set forth.

4. In a staple-stitching machine, the combination with a staple former having a deep longitudinal groove, of a driver located in the said groove, means for reciprocating the former and driver independently of each other, a pivotal anvil having a horizontal groove to receive the wire, and a retaining-spring applied to the outer face of the anvil, extended inward under the lower end thereof, and adapted in width to enter the lower end of the groove in the staple former, substantially as set forth.

5. In a staple-stitching machine, the combination with a staple former constructed with a deep longitudinal groove and two small vertical grooves respectively located opposite each other in the walls of the said longitudinal groove, and adapted to receive the wire, of a driver located in the said longitudinal groove of the former and composed of a body, a driving-plate attached to the lower end thereof, and made wider than it is to fit into the small grooves of the staple-former, and a retaining-plate corresponding in width to the said body, placed against the driving-plate and extending below the lower edge thereof to form a pocket to receive the crown of the completed staple, substantially as described.

6. In a staple-stitching machine, the combination with the feeding, cutting-off and forming and driving mechanisms, of an eccentric rod attached to the former of the forming and driving mechanism, which it actuates and constructed to have independent connection at a point below its connection with the said former with the cutter of the cutting off mechanism, substantially as described.

7. In a staple-stitching machine, the combination with a feeding mechanism, of a cutting-off mechanism including a spring-actuated rocking arm, and a cutter connected therewith, a forming and driving mechanism including a vertically movable former, and an eccentric-rod directly connected with the said former and having its lower end extended and adapted to engage with the inner end of the rocking-arm of the cutting-off mechanism, so that the one rod operates both the former and the said arm, having independent connection with each of the said parts substantially as set forth.

8. In the forming and driving mechanism of a staple-stitching machine, the combination with a vertically reciprocal former having a deep longitudinal groove, of a driver located in the said groove, an eccentric, an eccentric-strap, a rod connecting the eccentric strap with the said former, and a crank connecting the eccentric with the driver, substantially as set forth, and whereby the former and the driver are independently reciprocated from the same eccentric, substantially as described.

9. In a staple-stitching machine having a feeding mechanism a cut-off mechanism, and a staple forming and driving mechanism including a former and a driver, in combination with a driving-shaft, two eccentrics mounted on the said shaft, connection between one of the said eccentrics and the feeding mechanism whereby the same is operated, and connections between the other eccentric and the cut-off mechanism and the former and driver of the forming and driving mechanism, substantially as set forth.

10. In the clinching mechanism of a staple-stitching machine, the combination with two pivotal clinchers, of a vertically movable clinching-rod, provided at its upper end with a horizontally enlarged clinching-head located between the lower ends of the said clinchers and positively actuating the same both when the rod is raised and lowered, the said lower ends of the clinchers, and the said head being constructed for the positive operation of the former in both directions substantially as described.

11. In a staple-stitching machine, the combination with a stitching-table, of a post upon which the same is mounted, a socket in which the said post is supported, a spring which is used simply to assist in adjusting the table, interposed between the lower end of the post and the bottom of the socket, and means for fixing the post in any desired position of vertical adjustment in the socket against the tension of the said spring, substantially as set forth, and whereby the spring yields to permit the table to adjust itself to the work to be done after which the post is fixed and the table made permanent in position.

12. In a staple-stitching machine, a feeding mechanism including a ratchet and pawl, a cut-off mechanism including a cutter, and a forming and driving mechanism including a vertically reciprocal former having a deep longitudinal groove, and a driver located in the said groove; in combination with a driving-shaft, two eccentrics mounted thereupon, connection between one eccentric and the feeding mechanisms whereby the ratchet and pawl of the same are actuated, an eccentric strap on the other eccentric, a rod leading from the said strap and having independent connection with the said former of the forming and driving mechanism and the cutter of the cut-off mechanism, and a crank connecting the eccentric last mentioned with the driver, substantially as described.

In testimony whereof we have signed this specification in the presence of two subscribing witnesses.

FRANK S. BRADLEY.
JOSEPH P. LAVIGNE.

Witnesses:
GEORGE D. SEYMOUR,
FRED. C. EARLE.